(12) United States Patent
Pandari et al.

(10) Patent No.: US 10,740,324 B1
(45) Date of Patent: Aug. 11, 2020

(54) METHODS, APPARATUSES, AND SYSTEMS FOR INGESTING AND CONSUMING DATA UTILIZING A TRADING PARTNER MANAGER

(71) Applicant: Optum, Inc., Minnetonka, MN (US)

(72) Inventors: Krishna Pandari, Rosemount, MN (US); Arunkumar Ramasubramanian, Lakeville, MN (US); Vinod Anand Balasubramanian, Newington, CT (US)

(73) Assignee: Optum, Inc., Minnetonka, MN (US)

( * ) Notice: Subject to any disclaimer, the term of this patent is extended or adjusted under 35 U.S.C. 154(b) by 295 days.

(21) Appl. No.: 15/483,399

(22) Filed: Apr. 10, 2017

Related U.S. Application Data (60) Provisional application No. 62/319,869, filed on Apr. 8, 2016.

(51) Int. Cl.
*G06F 16/23* (2019.01)
*G06F 16/11* (2019.01)
*G06F 16/2455* (2019.01)

(52) U.S. Cl.
CPC ........ *G06F 16/2365* (2019.01); *G06F 16/128* (2019.01); *G06F 16/24561* (2019.01)

(58) Field of Classification Search
CPC ........... G06F 16/2365; G06F 16/24561; G06F 16/128
See application file for complete search history.

(56) References Cited

U.S. PATENT DOCUMENTS

| | | | | |
|---|---|---|---|---|
| 2011/0077973 | A1* | 3/2011 | Breitenstein | G06Q 10/10 705/3 |
| 2014/0280253 | A1* | 9/2014 | Clark | G06F 16/3344 707/755 |
| 2016/0162521 | A1* | 6/2016 | Pradhan | G06Q 10/10 707/602 |
| 2016/0253340 | A1* | 9/2016 | Barth | G06F 16/122 707/756 |
| 2016/0314249 | A1* | 10/2016 | Dunleavy | G06F 19/00 |
| 2017/0177309 | A1* | 6/2017 | Bar-Or | G06F 8/34 |

* cited by examiner

*Primary Examiner* — Alicia M Willoughby
(74) *Attorney, Agent, or Firm* — Alston & Bird LLP (57) ABSTRACT

Example methods, apparatuses, and systems are disclosed for ingesting and consuming data utilizing a trading partner manager. In one example embodiment, an example computing device receives user input comprising a set of data fabric configurations. The computing device then receives, into a data landing zone and based on the data fabric configurations, a data set from a data source. The computing device then ingests, based on the data fabric configurations, the received data set from the data landing zone into a data lake. The computing device then enriches, based on the data fabric configurations, the ingested data set. The computing device then enables data consumption of the ingested data set by the user.

15 Claims, 7 Drawing Sheets

METHODS, APPARATUSES, AND SYSTEMS FOR INGESTING AND CONSUMING DATA UTILIZING A TRADING PARTNER MANAGER

CROSS-REFERENCE TO RELATED APPLICATIONS

This application claims the benefit of U.S. Provisional Application No. 62/319,869 filed Apr. 8, 2016, the entire contents of which are incorporated herein by reference.

TECHNOLOGICAL FIELD

Example embodiments of the present invention relate generally to ingesting processing, and consuming data, such as healthcare data, in big data platforms and, more particularly, to methods and apparatuses that allow easy user interaction with the data.

BACKGROUND

The inventors have discovered limitations with existing techniques for handling data from acquisition to data management. Through applied effort, ingenuity, and innovation, the inventors have solved many of these identified limitations by developing a solution that is embodied by the present invention and described in detail below.

SUMMARY

Large amounts of both human resources and capital resources are spent attempting to manage and use the vast amounts of data stored in big data platforms. In some cases, making a small change in just one part of a big data platform or even extracting a particular new arrangement of data from the platform requires someone with significant database management knowledge (e.g., a database administrator) to devote a large amount of time to enabling the requested functionality. As a result, the user requesting the new functionality is unable to unilaterally implement the needed changes, and instead is left at the mercy of a database manager who may not fully understand the requested functionality and who may not prioritize the matter.

Example embodiments described herein solve these problems, among others, and provide a Data Management as a Service platform facilitating automation of database management functionality via a trading partner management interface. Example embodiments empower users who consume data to take control of the database management process. In doing so, example embodiments provide data management components that increase efficiency and decrease redundancy of resource utilization. In other words, embodiments of the data management as a service platform described herein allow for a user to configure and use a data ingestion and consumption system without having to largely rely on someone to manage the data platform, since the user can use an interface and predefined data fabric configurations to independently manage the data platform and consume the data.

Accordingly, example methods, apparatuses, and computer program products described herein are designed to easily and intuitively receive, ingest, enrich and consume data.

In a first example embodiment, a computer-implemented method for ingesting and consuming data utilizing a trading partner manager (TPM) interface is provided. The method includes receiving, by TPM circuitry of a computing device, user input from the TPM interface comprising a set of data fabric configurations, receiving, by communication circuitry of the computing device and into a data landing zone and based on the set of data fabric configurations, a data set from a data source, and ingesting, by data handling circuitry of the computing device and based on the data fabric configurations, the received data set from the data landing zone into a data lake. The method also further includes enriching, by the data handling circuitry of the computing device and based on the set of data fabric configurations, the ingested data set and consuming, by the computing device, the ingested data set.

In some embodiments, receiving the set of data fabric configurations includes causing, by the TPM circuitry of the computing device, display of the TPM interface, wherein the TPM interface comprises a user interface including user input fields and user selectable options, receiving, by the TPM circuitry and via at least one of the user input fields or the user selectable options, an identification of at least one inbound data source, wherein the at least one inbound data source is a user defined location for receiving data sets from the data source, and receiving, by the TPM circuitry and the user selectable options, at least one user selection of one or more data fabric configurations, wherein the one or more data fabric configurations comprise predefined options for ingesting, enriching, and consuming a data set from the data source.

In some embodiments, receiving the data set from the user-defined data source further includes issuing, by the communication circuitry of the computing device, a pull request requesting the data set to the user defined data source, and receiving, by the communication circuitry and by a transmission method, the data set from the user defined data source, wherein the transmission method comprises one of change data capture, sqoop, electronic communication gateway, or message queues.

In some embodiments, ingesting the received data set from the data landing zone into the data lake includes monitoring, by the data handling circuitry of the computing device, the data landing zone for a data set to be ingested, wherein the data set to be ingested is defined by the data fabric configurations, determining, by the data handling circuitry of the computing device, that the received data set is in the data landing zone, performing, by the data handling circuitry of the computing device, one or more pre-ingestion checks on the data set, wherein the one or more pre-ingestion checks comprise one or more of a file count check, a duplicate file check, an entity count check, a character set conversion, a file transfer completeness check, a schema evolution, and a timely arrival check, storing, by the data handling circuitry of the computing device, the data set into the data lake, and performing, by the data handling circuitry of the computing device, one or more post-ingestion checks on the data set, wherein the one or more post ingestion checks comprise one or more of a schema validation, and a record count check.

In some embodiments, enriching the ingested data set includes one or more of: generating, by the data handling circuitry of the computing device, a snapshot of the data set, wherein the snapshot identifies the most recently ingested data set, generating, by the data handling circuitry of the computing device, an optimized row columnar (ORC) snapshot of the determined snapshot, wherein the ORC snapshot comprises a compressed format of the determined snapshot, performing, by the data handling circuitry of the computing device, one or more data quality checks, wherein the one or more data quality checks comprise one or more of a default value check, a null check, a blank check, an alpha check, a length check, a valid value check, and a data type check, performing, by the data handling circuitry of the computing device, identity matching solutions, performing, by the data handling circuitry of the computing device, individual master data management, performing, by the data handling circuitry of the computing device, address standardization, or generating, by the data handling circuitry of the computing device, a set of data quality timeliness measurements.

In some embodiments, consuming the ingested data set includes selecting, by the data handling circuitry of the computing device, a view of the ingested data set, wherein the selected view of the ingested data set comprises either a hive view or a snapshot table of the ingested data set, receiving, by the TPM circuitry of the computing device, a user query, and querying, by the data handling circuitry of the computing device, the selected view of the ingested data set according to the received user query.

In some embodiments, the computer-implemented method for ingesting and consuming data utilizing a trading partner manager (TPM) interface further includes performing, by the data handling circuitry of the computing device, one or more additional data operations on the ingested data set and data handling processes, wherein the one or more additional data operations comprise one or more of heartbeat monitoring of the data handling processes, restarting of failed data handling processes, generating one or more reports regarding the data handling processes, handling errors occurring in one or more of the data handling processes, and maintaining security of the data handling processes and ingested data set.

In another example embodiment, an apparatus for ingesting and consuming data utilizing a trading partner manager (TPM) interface is provided. The apparatus includes TPM circuitry configured to receive user input from the TPM interface comprising a set of data fabric configurations. The apparatus also includes communication circuitry configured to receive, into a data landing zone and based on the set of data fabric configurations, a data set from a data source. The apparatus also further includes data handling circuitry configured to ingest, based on the data fabric configurations, the received data set from the data landing zone into a data lake, enrich, based on the data fabric configurations, the ingested data set, wherein the TPM circuitry and data handling circuitry are further configured to consume the ingested data set.

In some embodiments of the apparatus, the TPM circuitry is configured to cause display of the TPM interface, wherein the TPM interface comprises a user interface including user input fields and user selectable options, receive, via at least one of the user input fields or the user selectable options, an identification of at least one inbound data source, wherein the at least one inbound data source is a user defined location for the data set from the data source, and receive, by the user selectable options, at least one user selection of one or more data fabric configurations, wherein the one or more data fabric configurations comprise predefined options for ingesting, enriching, and consuming a data set from the data source.

In some embodiments of the apparatus, the communication circuitry is further configured to issue a pull request requesting the data set to the user defined data source and receive, by a transmission method, the data set from the user defined data source, wherein the transmission method comprises one of change data capture, sqoop, electronic communication gateway, or message queues.

In some embodiments of the apparatus, the data handling circuitry is further configured to monitor the data landing zone for a data set to be ingested, wherein the data set to be ingested is defined by the data fabric configurations, determine that the received data set is in the data landing zone, perform one or more pre-ingestion checks on the data set, wherein the one or more pre-ingestion checks comprise one or more of a file count check, a duplicate file check, an entity count check, a character set conversion, a file transfer completeness check, a schema evolution, and a timely arrival check, store the data set into the data lake, and perform one or more post-ingestion checks on the data set, wherein the one or more post ingestion checks comprise one or more of a schema validation, and a record count check.

In some embodiments of the apparatus, the data handling circuitry is further configured to generate a snapshot of the data set, wherein the snapshot identifies the most recently ingested data set, generate an optimized row columnar (ORC) snapshot of the determined snapshot, wherein the ORC snapshot comprises a compressed format of the determined snapshot, perform one or more data quality checks, wherein the one or more data quality checks comprise one or more of a default value check, a null check, a blank check, an alpha check, a length check, a valid value check, and a data type check, perform identity matching solutions, perform individual master data management, perform address standardization, or generate a set of data quality timeliness measurements.

In some embodiments of the apparatus, the data handling circuitry is further configured to select a view of the ingested data set, wherein the selected view of the ingested data set comprises either a hive view or a snapshot table of the ingested data set. In some examples, the TPM circuitry is further configured to receive a user query, and the data handling circuitry is further configured to query the selected view of the ingested data set according to the received user query.

In some embodiments of the apparatus, the data handling circuitry is further configured to perform one or more additional data operations on the ingested data set and data handling processes, wherein the one or more additional data operations comprise one or more of heartbeat monitoring of the data handling processes, restarting of failed data handling processes, generating one or more reports regarding the data handling processes, handling errors occurring in one or more of the data handling processes, and maintaining security of the data handling processes and ingested data set.

In yet another example embodiment a non-transitory computer-readable storage medium for ingesting and consuming data utilizing a trading partner manager (TPM) interface is provided. The non-transitory computer-readable storage medium storing program code instructions that, when executed, cause a computing device to receive user input from the TPM interface comprising a set of data fabric configurations, receive, into a data landing zone and based on the set of data fabric configurations, a data set from a data source, ingest, based on the data fabric configurations, the received data set from the data landing zone into a data lake. The non-transitory computer-readable storage medium may further store program code instructions that, when executed enrich, based on the data fabric configurations, the ingested data set and consume the ingested data set.

In some embodiments, the program code instructions, when executed, further cause the computing device to cause display of the TPM interface, wherein the TPM interface comprises a user interface including user input fields and user selectable options, receive, via at least one of the user input fields, or the user selectable options, an identification of at least one inbound data source, wherein the at least one inbound data source is a user defined location for receiving data sets from the data source, and receive, by the user selectable options, at least one user selection of one or more data fabric configurations, wherein the one or more data fabric configurations comprise predefined options for ingesting, enriching, and consuming a data set from the data source.

In some embodiments, the program code instructions, when executed, further cause the computing device to issue a pull request requesting the data set to the user defined data source and receive, by a transmission method, the data set from the user defined data source, wherein the transmission method comprises one of change data capture, sqoop, electronic communication gateway, or message queues.

In some embodiments, the program code instructions, when executed, further cause the computing device to monitor the data landing zone for a data set to be ingested, wherein the data set to be ingested is defined by the data fabric configurations, determine that the received data set is in the data landing zone, perform one or more pre-ingestion checks on the data set, wherein the one or more pre-ingestion checks comprise one or more of a file count check, a duplicate file check, an entity count check, a character set conversion, a file transfer completeness check, a schema evolution, and a timely arrival check, store the data set into the data lake, perform one or more post-ingestion checks on the data set, wherein the one or more post ingestion checks comprise one or more of a schema validation, and a record count check, generate a snapshot of the data set, wherein the snapshot identifies the most recently ingested data set, generate an optimized row columnar (ORC) snapshot of the determined snapshot, wherein the ORC snapshot comprises a compressed format of the determined snapshot, perform one or more data quality checks, wherein the one or more data quality checks comprise one or more of a default value check, a null check, a blank check, an alpha check, a length check, a valid value check, and a data type check, perform identity matching solutions, perform individual master data management, perform address standardization, or generate a set of data quality timeliness measurements.

In some embodiments, the program code instructions, when executed, further cause the computing device to select a view of the ingested data set, wherein the selected view of the ingested data set comprises either a hive view or a snapshot table of the ingested data set, wherein the TPM circuitry is further configured to receive a user query, and wherein the data handling circuitry is further configured to query the selected view of the ingested data set according to the received user query.

In some embodiments, the program code instructions, when executed, further cause the computing device to perform one or more additional data operations on the ingested data set and data handling processes, wherein the one or more additional data operations comprise one or more of heartbeat monitoring of the data handling processes, restarting of failed data handling processes, generating one or more reports regarding the data handling processes, handling errors occurring in one or more of the data handling processes, and maintaining security of the data handling processes and ingested data set.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Various embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data,", "data set," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

System Architecture and Example Apparatus

Systems for ingesting and consuming data may be embodied by any of a variety of devices. For example, an apparatus employed in an example embodiment may be embodied by a networked device, such as a server or other network entity configured to communicate with one or more devices, such as one or more client devices. Additionally or alternatively, the apparatus may be embodied by a fixed computing device, such as a personal computer or a computer workstation or by any of a variety of mobile terminals, such as a portable digital assistant (PDA), mobile telephone, smartphone, laptop computer, tablet computer, or any combination of the aforementioned devices.

Figure 1:
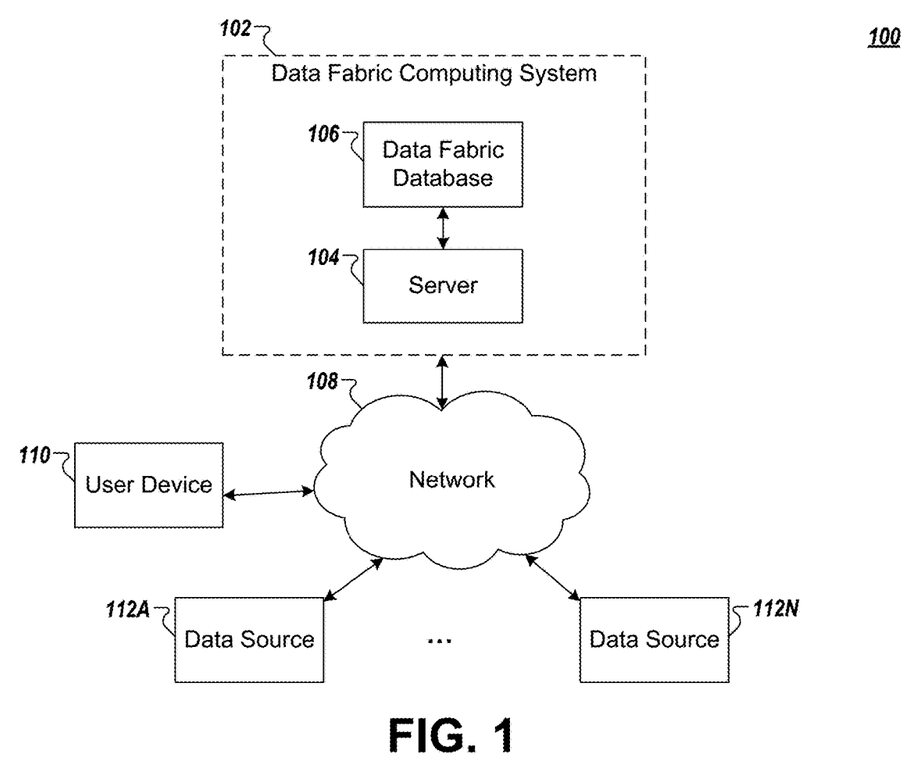
FIG. 1 shows an example system diagram, in accordance with some example embodiment of the present invention.

In this regard, FIG. 1 discloses an example computing system within which embodiments described herein may operate. Data source partners including healthcare information systems, such as insurance companies or health care providers, may configure, through an easy to use user interface on a user device 110, Data Fabric (DF) computing system 102 to acquire data from data sources, such as data sources 112A through 112N via a network 108 (e.g., the Internet, or the like).

The data sources 112A through 112N, may be embodied by any computing devices known in the art, but generally will be embodied by a database system of some kind hosted by a fixed computing device or a distributed system, as would be understood by one having ordinary skill. The data sources 112A through 112N may be configured to transmit data sets using one or more transmission modes and/or protocols. In some embodiments, the data sources 112A-112N may include hardware or firmware specifically designed to interface with the DF computing system 102 (e.g., where an example device 110 is a purpose-built device offered for communicating with the DF computing system 102), although such a purpose-built design is not necessary where the data sources 112A-112N can utilize standardized transmission modes and/or protocols to communicate with the DF computing system 102. In some embodiments, data source partners and/or other third parties may interact with the DF computing system 102 via a web browser displayed by a corresponding terminal of a data source 112.

The DF computing system 102 may comprise a server 104 in communication with a data fabric database 106. The server 104 may be embodied as a computer or computers as known in the art. The server 104 may receive the electronic data from various sources, including but not necessarily limited to the user device 110 and data sources 112A-112N, and may be operable to receive and process data sets and other information provided by these devices.

The data fabric database 106 may be embodied as a data storage device such as a Network Attached Storage (NAS) device or devices, or as a separate database server or servers. The data fabric database 106 includes information accessed and stored by the server 104 to facilitate the operations of the DF computing system 102. For example, the data fabric database 106 may include, without limitation: user account credentials for system administrators, clients, and other third parties; and sets of structured data (e.g., relational databases) correlating to data fabric configurable options. As may be most relevant to the embodiments described herein, however, data fabric database 106 may host sets of data fabric configurations and a data lake configured to store large amounts of data for use in the embodiments described herein.

Example Apparatus for Implementing Embodiments of the Present Invention

Figure 2:
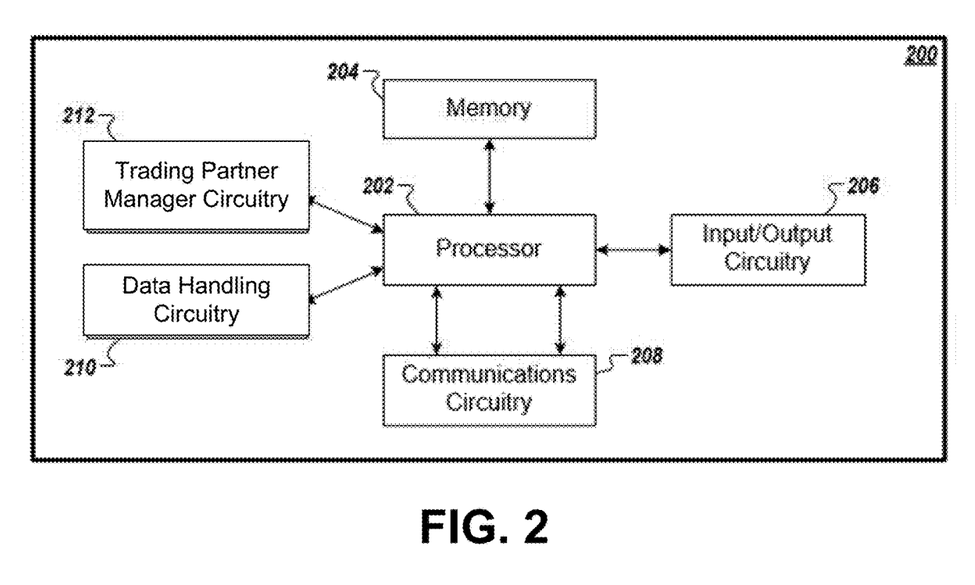
FIG. 2 illustrates a schematic block diagram of circuitry used in association with a data fabric computing device, in accordance with some example embodiments.

The server 104 may be embodied by one or more computing devices, such as apparatus 200 shown in FIG. 2. As illustrated in FIG. 2, the apparatus 200 may include a processor 202, memory 204, input/output circuitry 206, communications circuitry 208, data handling circuitry 210, and trading partner manager (TPM) circuitry 212. The apparatus 200 may be configured to execute the operations described above in connection with FIG. 1 and below in connection with FIGS. 4-9. Although these components 202-212 are described in part using functional terminology, it should be understood that implementation of the corresponding functions necessarily requires the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments it may also include software that configures operation of the hardware. In some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

The processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to a user and, in some embodiments, to receive an indication of user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The data handling circuitry 210 and TPM circuitry 212 may be any means such as a device or circuitry embodied in either hardware or a combination of hardware and software that is configured to perform the corresponding functions of these components that are described herein.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

In some embodiments, one or more external systems (such as a remote cloud computing and/or data storage system) may also be leveraged to provide at least some of the functionality discussed herein.

As described above and as will be appreciated based on this disclosure, example devices employed by various example embodiments described herein may be configured as methods, mobile devices, backend network devices, and the like. Accordingly, embodiments may comprise various means including entirely of hardware or combinations of software and hardware. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Operations Performed by the DF Computing Device

Having described the circuitry comprising embodiments of the present invention, it should be understood that the DF computing system 102 may advantageously identify significant incidental findings in a number of ways. In accordance with example embodiments, FIG. 3 illustrates an example user interface showing user input fields and selection menus, while FIGS. 4-9 illustrate flowcharts containing specific operations performed to ingest and consume data utilizing a trading partner manager, comprising a user interface such as that shown in relation to FIG. 3.

Figure 3:
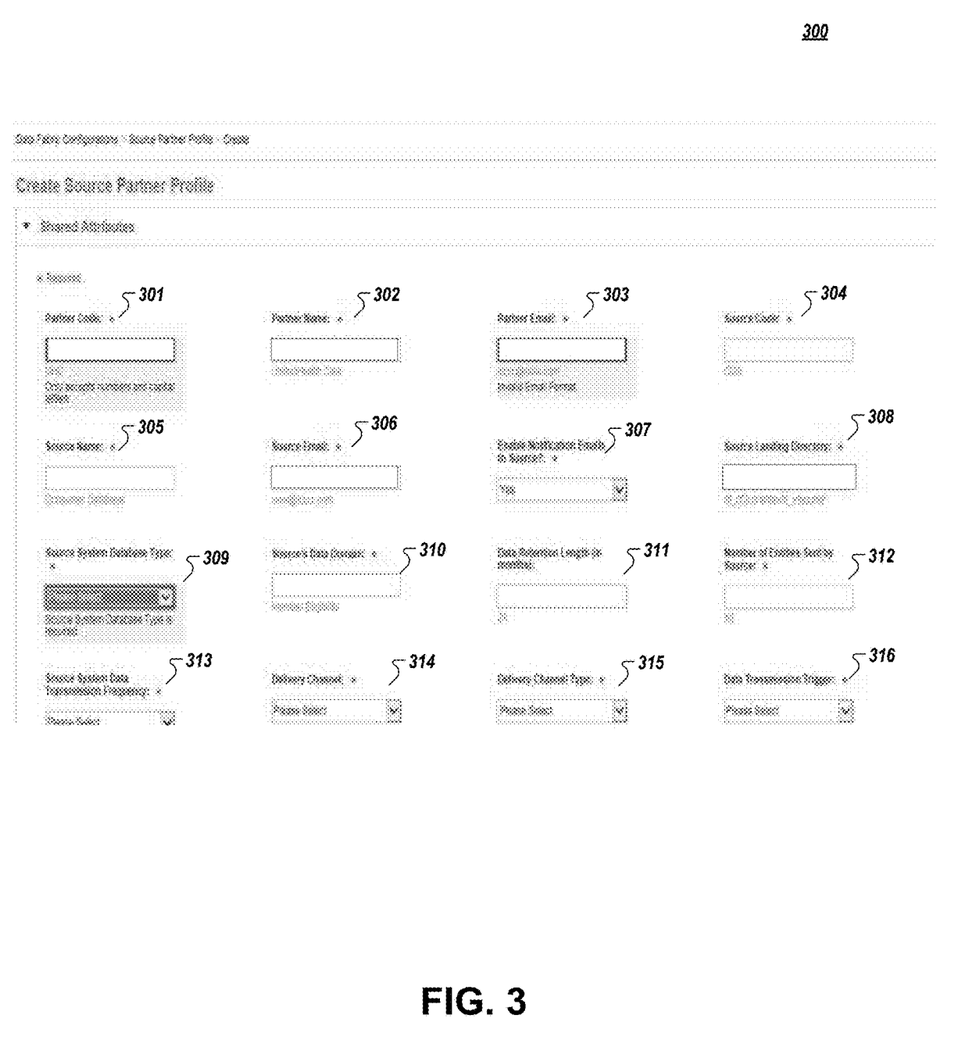
FIG. 3 illustrates an example user interface, in accordance with some example embodiments.

For example, FIG. 3 illustrates part of a Trading Partner Management interface, which may be displayed on a user device such as device 110. Input fields 301-316 comprise example input fields including text input fields (e.g., field 301) and dropdown or selectable input fields (e.g., field 309). The drop down input fields may include predefined options for a user to select that define certain elements of a data fabric configuration to be used for ingesting and consuming data. In some examples, input/output circuitry 206 and TMP circuitry 212 are configured to enforce user input constraints as shown in 301 ("Only accepts numbers and capital letters"), 303 ("Invalid Email Format") and 309 ("Source System Database Type is required").

Figure 4:
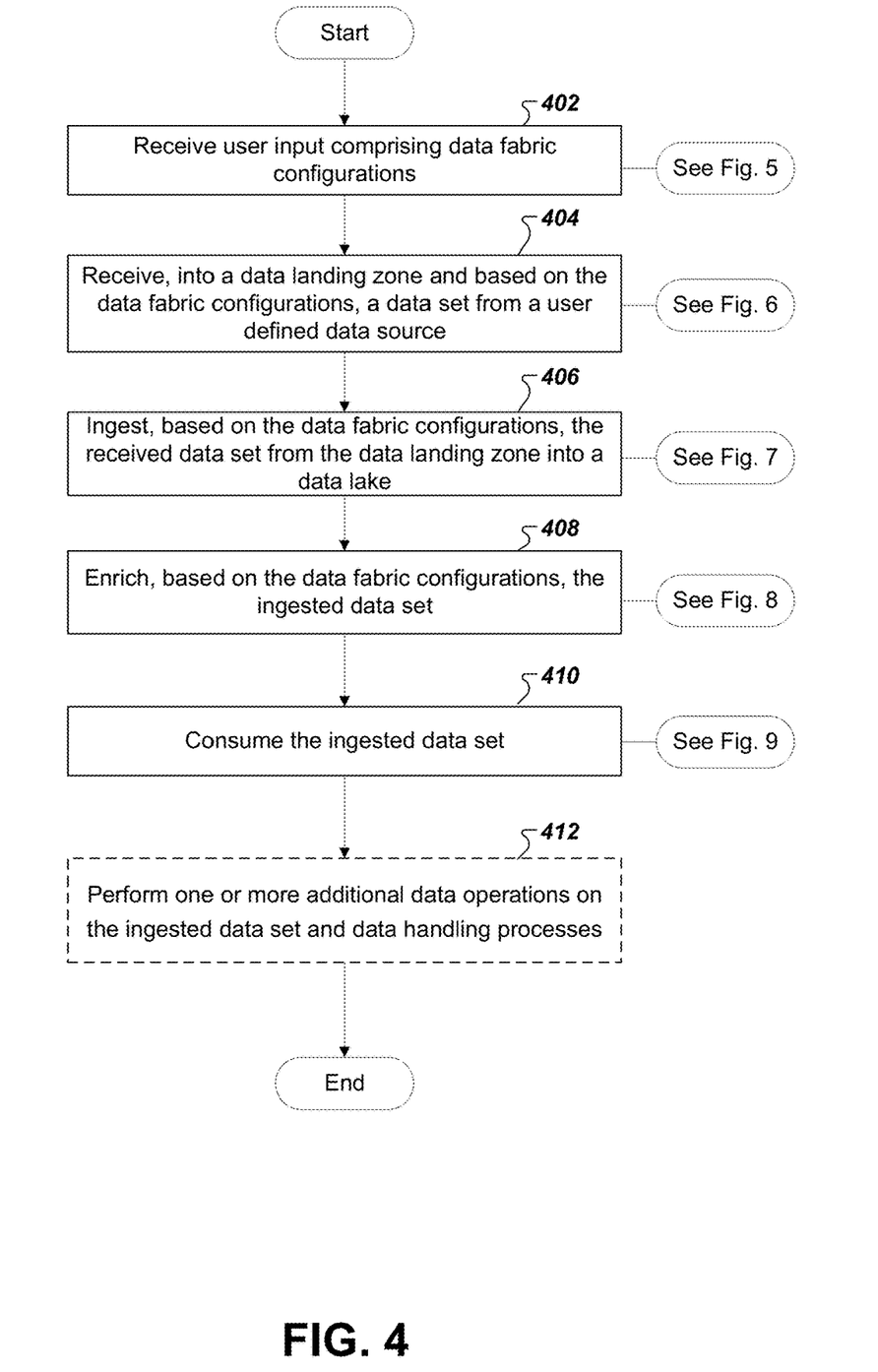
FIG. 4 illustrates a flowchart describing example operations for ingesting and consuming data, in accordance with some example embodiments.

Turning now to FIG. 4, a flowchart is provided that illustrates a detailed sequence of example operations for ingesting and consuming data utilizing a TPM interface, in accordance with some example embodiments. In general the operations of the ingesting and consuming data comprise: trading partner management (i.e., the process of maintaining and managing client information including preferences and data fabric configurations); data acquisition (i.e., the process of transmitting data from a source to the a landing zone of the data fabric computing system); data ingestion (i.e., the process of moving data from landing zone into a data lake); data enrichment (i.e., the process of enriching the data through integration with other systems and applying business rules as specified by the client); and data consumption (i.e., the process where users may query the system).

Example operation are further described herein in operations 402-410. In general the operations of the ingesting and consuming data may also comprise performing operations including the process of managing metadata, reporting, error handling, infrastructure, and security, as described in operation 412. While operation 412 is illustrated as occurring after operation 410, it will be understood that operation 412 could occur at any point during the ingestion and consumption process represented by FIG. 4.

As noted previously, the various operations described below may be performed by DF computing system 102, with the assistance of, and/or under the control of a computing device such as server 104, which may be embodied by apparatus 200.

In operation 402, apparatus 200 includes means, such as TPM circuitry 212, input/output circuitry 206, or the like, for receiving user input comprising a set of data fabric configurations from a TPM interface. This process may utilize input fields and selectable options such as those shown in FIG. 3. The TPM interface may comprise a user interface or dashboard (as shown in FIG. 3) configured to register a data source (such as data sources 112A-112N) with the DF computing system 102, thus enabling data to be automatically ingested from the data source into a data lake, such as data fabric database 106. Operation 402 may also include, utilizing the TPM circuitry, creation of the TPM interface itself, thus providing a framework to effectively manage the various trading partners (i.e., users).

In some examples, when a user first engages with DF computing system 102, the TPM circuitry will perform an initial setup. The first step in the initial setup may include the user creating and submitting a user profile utilizing TPM circuitry 212, wherein the profile may be stored in memory 204 or data fabric database 106. The profile may be easily created using input fields and drop down input fields such as those shown in FIG. 3, thus allowing a user to select and utilize the functions of DF computing system 102 without the need have detailed knowledge of the lower-level database management processes traditionally required to design a database system. Accordingly, as part of the initial setup of example embodiments, DF computing system 102 gathers all the information required to automatically transmit and manage data successfully.

In some examples, this information includes client (e.g., a user) information such as a description of the Partner/Trading Partner (e.g., a data source), client contact information (e.g., user email), and a partner landing directory where the ingested files will be sent (e.g., a directory in data fabric database 106).

In some examples, this information also includes information regarding the nature of the data sets that may be received by DF computing system 102 from a data source, including file types (e.g. Health Level Seven (HL7), a communication protocol for healthcare application integration, X12, a file format for cross-industry standards for electronic documents, Electronic Data Interchange (EDI), an exchange of standard documents between two computers, or structured and unstructured data formats (files, message queues/XML files) and file names.

In some examples, this information also includes data transmission information including transmission type (e.g. Electronic Communication Gateway (ECG)/Secure File Transfer Protocol (SFTP), Change Data Capture (CDC), Sqoop), transmission frequency (i.e. monthly, weekly, daily, hourly, etc.), and transmission volume (i.e., the size of a transmission).

The user profile may include selectable options comprising fields such as shared attributes, incremental load attributes and initial full load attributes, or the like. Each of these sets of attributes may be configured to process file information for ingesting and consuming the data in the DF computing system 102.

In some examples, the apparatus 200 may be configured to analyze the user inputs and inputted configurations by processes such as HBase and Splunk to verify that the user information and data configurations are inputted and loaded successfully. Additional functionality regarding operation 402 is further described in connection with FIG. 5 below.

In operation 404, apparatus 200 includes means, such as communication circuitry 208, or the like, for receiving, into a data landing zone and based on the set of data fabric configurations, a data set from a user defined data source. In this regard, the receipt of a data set is based on the set of data fabric configurations because the set of data fabric configurations define, among other things, the expected format of the data sets to be received from the data source. In general, the process of data acquisition (i.e. receiving data into the landing zone), may include a Change Data Capture (CDC) module, in the data source, which performs a process used to determine whether the data sets received from the data source into the landing zone of the DF computing system 102 follow the format expected from the set of data fabric configurations. In some examples, the CDC module implements a process which removes Remote procedural call (RPC) process overhead by collecting data updates immediately, such as whenever an update/commit is made on any tables/data records in a given database (e.g. a data source). In some examples, the update details are captured in a transaction commit log. When a threshold (such as an n number of records/transaction in a given table or could a time interval) is reached, a data file is created with the update information (including the data file, a metadata file and one or more control files). The data file and update information are then pushed to the DF computing system 102.

In some examples, incremental data is pushed into the respective landing zone on a set frequency configured by the user. In some examples, the data source may comprise relational databases such as a DB2, an Oracle server, or a SQL Server. Thus, whenever an update/commit is made on any tables/records in a given data source database, all these details are captured in a transaction commit log. When the threshold (e.g., the number of records/transaction in a given table or a time interval) is reached, a data file is created with all the update information. Along with the data file, a metadata file, and a set of control files are created and then the data set is transmitted to the landing zone of the DF computing system 102 for processing (ingestion).

The CDC process allows the DF computing system 102 to capture data in near real time in order to support various features of the DF computing system 102, such as: Data Quality processes, Master Data Management (MDM) and other Big Data Capabilities such as Data Migration, Data Synchronization, Business Analytics, etc. Other steps falling within the umbrella of operation 404 are described in greater detail in connection with FIG. 6.

In operation 406, apparatus 200 includes means, such as data handling circuitry 210, or the like, for ingesting, based on the data fabric configurations, the received data set from the data landing zone into a data lake. This operation is described in greater detail below in connection with FIG. 7.

In operation 408, apparatus 200 includes means, such as data handling circuitry 210, or the like, for enriching, based on the data fabric configurations, the ingested data set. In general, enriching the ingested data includes processes of transforming, standardizing, quality checking, and integrating data contained in the data set in a way that provides a richer output for users to consume. This operation is described in greater detail in connection with FIG. 8.

In operation 410, apparatus 200 includes means, such as TPM circuitry 212, data handling circuitry 212, or the like, for consuming the ingested data set. In general, data consumption allows a user to query ingested and/or enriched data sets including Hive views (Raw (ingested) Data) and Snapshot tables (most recent version of the data). This operation is described in connection with FIG. 9.

Finally, as shown in operation 412, the apparatus 200 may optionally include means, such as processor 202, TPM circuitry, 212, data handling circuitry 210, or the like, for performing one or more additional optional data operations on the ingested data set and data handling processes. In various embodiments, these additional optional operations may including heartbeat monitoring of the data handling processes, restarting of failed data handling processes, generating one or more reports regarding the data handling processes, handling errors occurring in one or more of the data handling processes, and maintaining security of the data handling processes and ingested data set. In some examples, the additional operations may include data quality processes such as automated data reconciliation. The automated data reconciliation may reconcile data (such as a data source to consumption ready state) through an automated process. This process may including tracking, monitoring, alerting and ensuring data availability, completeness, and timeliness of the data flow through the DF computing system 102 to ensure there is no data loss.

Figure 5:
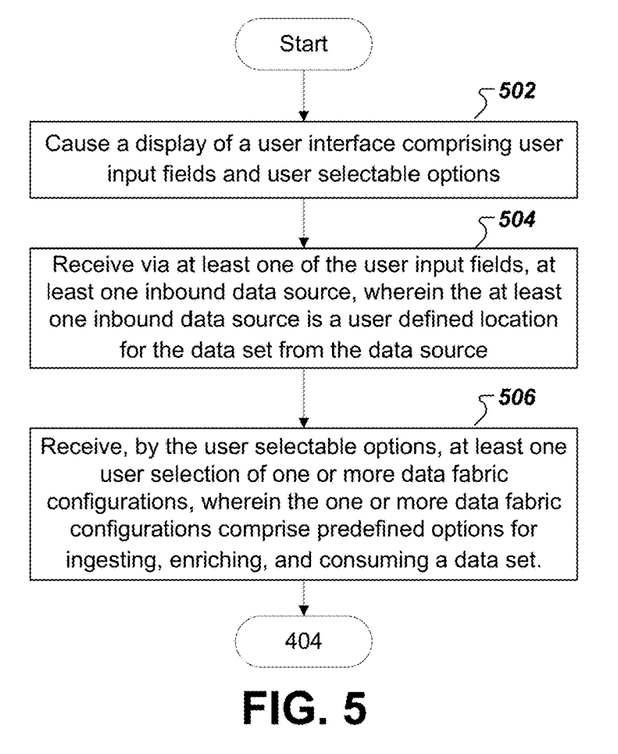
FIG. 5 illustrates a flowchart describing additional example operations for ingesting and consuming data, in accordance with some example embodiments.

Turning now to FIG. 5, a flowchart is provided that illustrates additional example operations for ingesting and consuming data utilizing a TPM interface, in accordance with some example embodiments. Specifically, FIG. 5 illustrates operations for receiving the data fabric configurations in greater detail than that described in connection with operation 402 of FIG. 4. As noted previously, the operations receiving the data fabric configurations may be performed by DF computing system 102, with the assistance of, and/or under the control of a computing device such as server 104, which may be embodied by apparatus 200. As described below, apparatus 200 may be configured to receive the data fabric configurations.

In operation 502, apparatus 200 includes means, such as TPM circuitry 212, input/output circuitry 206, or the like, for causing display of a TPM interface comprising user input fields and user selectable options, such as that shown in FIG. 3.

In operation 504, apparatus 200 includes means, such as TPM circuitry 212, input/output circuitry 206, or the like, for receiving, via at least one of the user input fields such as input field 308, an identification of at least one inbound data source, wherein the at least one inbound data source is a user defined location from which data sets will be received.

In operation 506 apparatus 200 includes means, such as TPM circuitry 212, input/output circuitry 206, or the like, for receiving, according to the user selectable options, at least one user selection of one or more data fabric configurations, wherein the one or more data fabric configurations comprise predefined options for ingesting, enriching, and consuming a data set received from the inbound data source.

Figure 6:
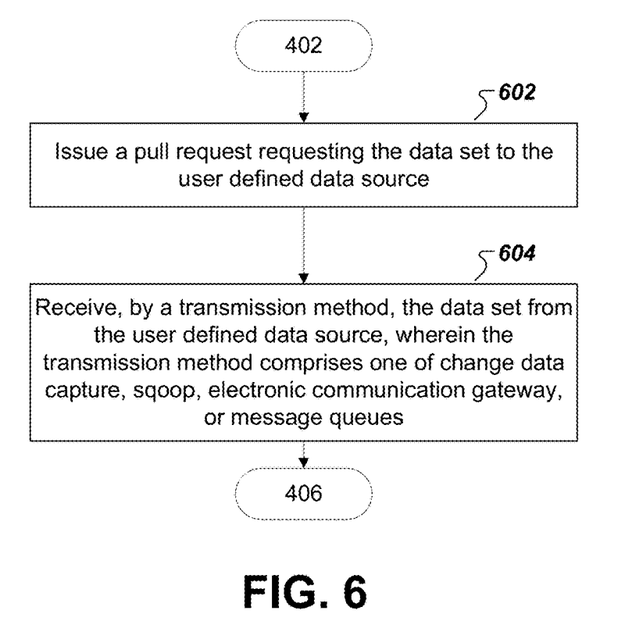
FIG. 6 illustrates a flowchart describing additional example operations for ingesting and consuming data, in accordance with some example embodiments.

Turning now to FIG. 6, a flowchart is provided that illustrates additional example operations for receiving a data set from a data source. These operations illustrate this functionality in greater detail than that described in connection with operation 404 of FIG. 4. As noted previously, the operations for receiving the data set from the user-defined data source may be performed by DF computing system 102, with the assistance of, and/or under the control of a computing device such as server 104, which may be embodied by apparatus 200. As described below, apparatus 200 may be configured to receive the data set from the user-defined data source.

In operation 602, apparatus 200 includes means, such as communication circuitry 208, or the like, for issuing a pull request requesting the data set to the user defined data source.

In operation 604, apparatus 200 includes means, such as communication circuitry 208, or the like, for receiving, by a transmission method, the data set from the user defined data source, wherein the transmission method comprises one of change data capture, Sqoop, electronic communication gateway, or message queues as defined by the data fabric configurations. In addition to the CDC functionality described above, the transmission methods may include a Sqoop transmission. In Sqoop, data is transferred in bulk from structured data stores in a data source, such as data source 110A, to the landing zone. In some examples, Sqoop may directly pull the data from the data sources. In general, Sqoop may be utilized for historical data loading whereas CDC is utilized for incremental data loading.

For example: Sqoop can be used to import the data from a Relational Database Management System (RDBMS) such as Oracle, Mainframe, or MySQL into a Hadoop Distributed File System (HDFS) in the DF computing system 102.

The transmission method may also include Electronic Communication Gateway (ECG) which utilizes a Secure File Transfer Protocol to transmit data from an external system to the landing zone in the DF computing system 102.

In some examples, the transmission method may also include Message Queues which can efficiently support higher volume of synchronized messages pushed in real-time instead of periodically polled. Some example implementations of Message Queues which may be used in DF computing system 102 include Rabbit MQ and Web sphere MQ.

Figure 7:
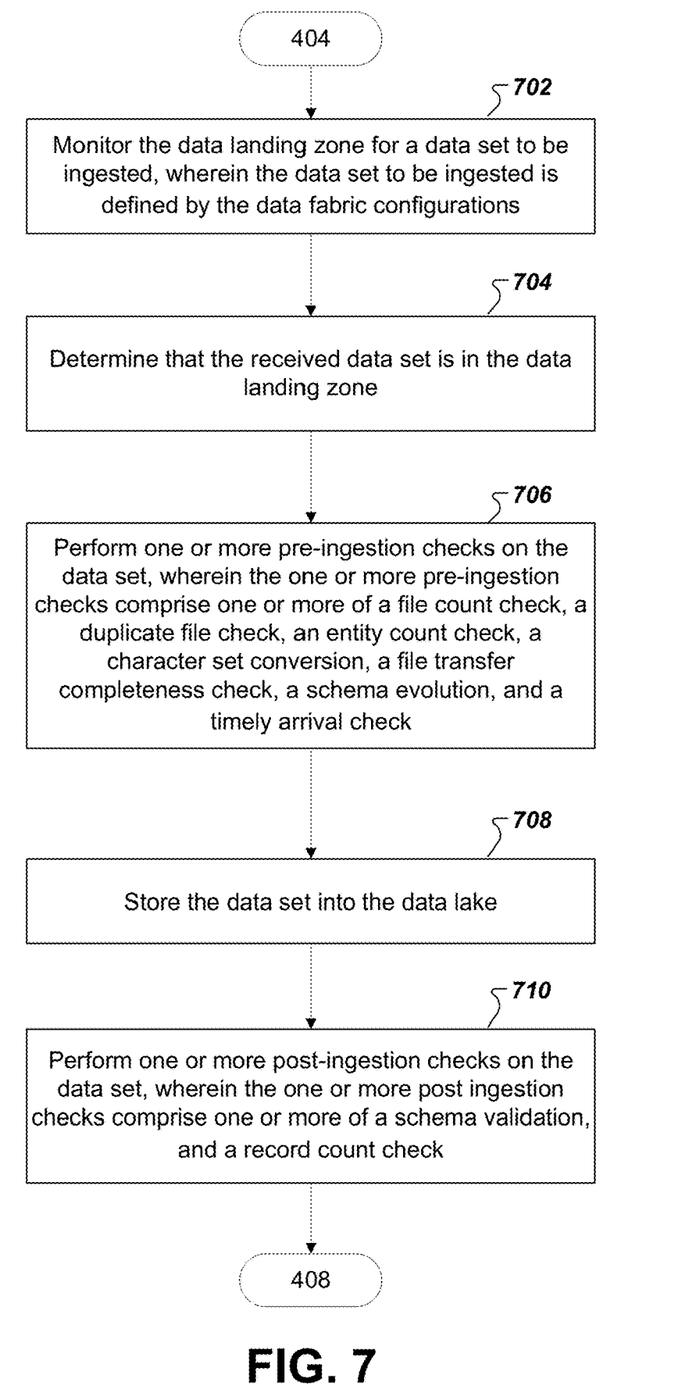
FIG. 7 illustrates a flowchart describing additional example operations for ingesting and consuming data, in accordance with some example embodiments.

Turning now to FIG. 7, a flowchart is provided that illustrates additional example operations for ingesting a received data set from a data landing zone into the data lake. The operations described in connection with FIG. 7 describe this functionality in greater detail than provided in operation 406 of FIG. 4. As noted previously, the operations for ingesting the received data set from the data landing zone into the data lake may be performed by DF computing system 102, with the assistance of, and/or under the control of a computing device such as server 104, which may be embodied by apparatus 200. As described below, apparatus 200 may be configured to ingest the received data set from the data landing zone into the data lake.

In operation 702, apparatus 200 includes means, such as data handling circuitry 210, or the like, for monitoring the data landing zone for a data set to be ingested, wherein the data set to be ingested is defined by the data fabric configurations.

In operation 704, apparatus 200 includes means, such as data handling circuitry 210, or the like, for determining that the received data set is in the data landing zone. It will be understood that although apparatus 200 may monitor the data landing zone and take action in response to detection of new data sets that have been added to the landing zone, the operations for ingesting such data sets may alternatively be performed in a batch process that occurs periodically, in predefined intervals, or upon initiation by a user.

In operation 706, apparatus 200 includes means, such as data handling circuitry 210, or the like, for performing one or more pre-ingestion checks on the data set, wherein the one or more pre-ingestion checks comprise one or more of a file count check, a duplicate file check, an entity count check, a character set conversion, a file transfer completeness check, a schema evolution, and a timely arrival check.

In some examples, the schema evolution may include automatic schema management, enabled by data handling circuitry 210, to detect and track schema changes to a data entity in a data source, which avoids manual intervention through configuration. For example, an inbuilt schema evolution module keeps track of incoming schema in an entity partner pro-file table. Thus each time a schema file is received, a checksum is calculated on the file and checked against an existing checksum if any. If the checksum is not matching, the module automatically assumes that a schema is changed for a given data table and a new version details are updated and cascaded. This process also combines all the different version of schema and creates one unified view all the time which eases consumption.

In operation 708, apparatus 200 includes means, such as data handling circuitry 210, or the like, for storing the data set into the data lake.

In operation 710, apparatus 200 includes means, such as data handling circuitry 210, or the like, for performing one or more post-ingestion checks on the data set, wherein the one or more post ingestion checks comprise one or more of a schema validation, and a record count check. In some examples, any of the data enrichments may be considered as post-ingestion check validations. For example, snapshot time validations (i.e. when snapshot is created) and IMS (identity matching solutions) key validations may be used as post-ingestion/validation checks.

Figure 8:
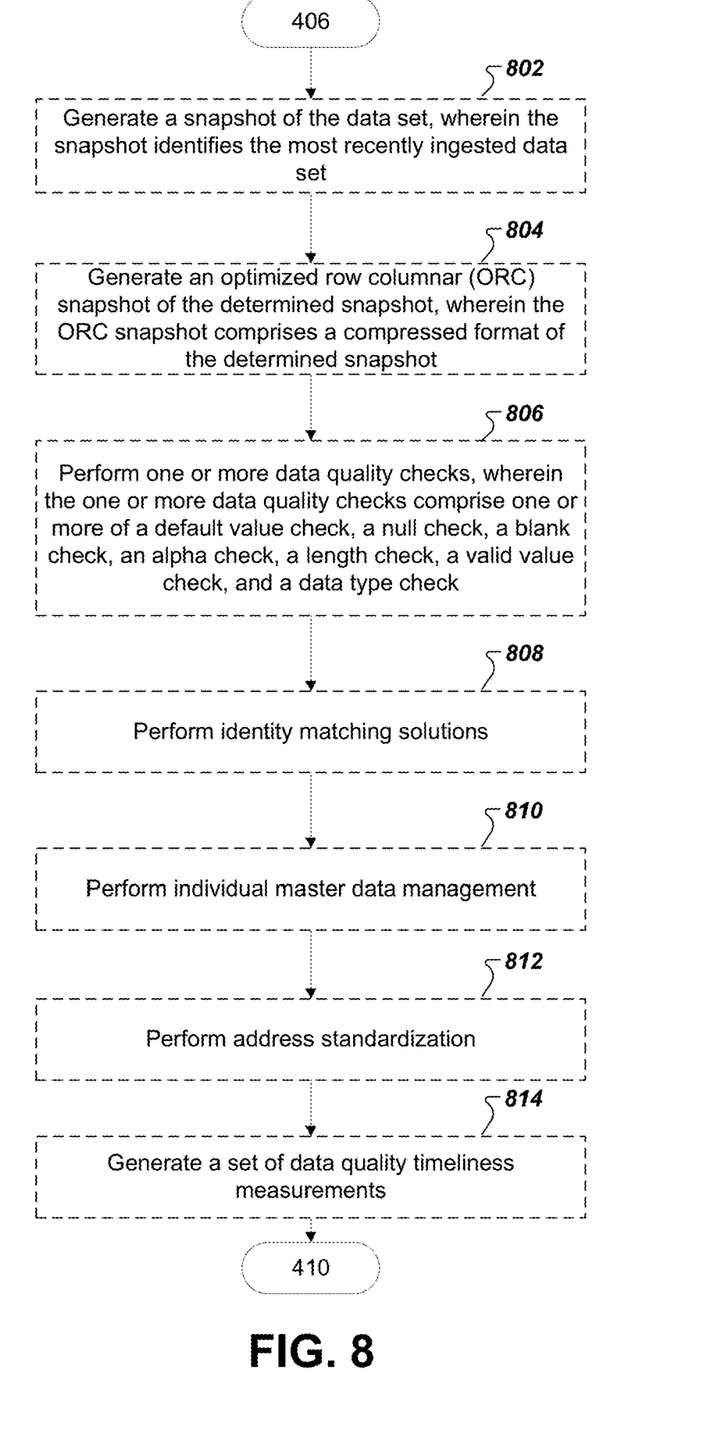
FIG. 8 illustrates a flowchart describing additional example operations for ingesting and consuming data, in accordance with some example embodiments.

Turning now to FIG. 8, a flowchart is provided illustrating a set of optional example operations for enriching the ingested data set. These operations are recited as optional, because enrichment of the ingested data is not technically a necessary element for managing data. In any event, the operations described in connection with FIG. 8 illustrate such enrichment functionality in greater detail than set forth previously in connection with operation 408 of FIG. 4. As noted previously, the operations for enriching the ingested data may be performed by DF computing system 102, with the assistance of, and/or under the control of a computing device such as server 104, which may be embodied by apparatus 200. As described below, apparatus 200 may be configured to enrich the ingested data.

In operation 802, apparatus 200 includes means, such as data handling circuitry 210, or the like, for generating a snapshot of the data set, wherein the snapshot identifies the most recently ingested data set. In some examples, creating a snapshot with the latest view is achieved by using HBase. For example, whenever HBase gets updated, by default it adds the current epoch timestamp for every column/column family in a data set. HBase then reflects the data with most recent timestamp. The update timestamp/last modified timestamp in the source file is then converted to Unix epoch time. When loading the data to HBase, the default current epoch time is overridden with the timestamp from the source file (last modified time of the record). This way, the data record (primary key combination) with the highest time stamp would be reflected in the HBase. Utilizing this method of producing a snapshot avoids expensive group by and order by logic to get the latest record for a given primary key.

In operation 804, apparatus 200 includes means, such as data handling circuitry 210, or the like, for generating an optimized row columnar (ORC) snapshot of the determined snapshot, wherein the ORC snapshot comprises a compressed format of the determined snapshot. For example, an ORC Snapshot is a single, point-in-time copy of a data entity Snapshot in a compressed format that is smaller and more efficient for data consumption such as reading, writing, and processing. In some examples, a normal Snapshot, provides for quick data access when the file has few rows and column; however, if the file contains huge volume of data (e.g. many rows and columns), the retrieval of data may be very slow. In contrast, for users, queries on ORC Snapshot may be more efficient than queries on HBase Snapshot. In some examples, the ORC Snapshot also allows users to query a one-time full extract and incremental change extracts thereafter. In some examples, the ORC Snapshot data is accessed by a user writing an SQL query against a Hive view. For example, the ORC Snapshot may have two Hive views; one that only returns results for the most recent version of each record, and one that returns results for all records currently stored in the ORC Snapshot (the original full set plus incremental updates).

In operation 806, apparatus 200 includes means, such as data handling circuitry 210, or the like, for performing one or more data quality checks, wherein the one or more data quality checks comprise one or more of a default value check, a null check, a blank check, an alpha check, a length check, a valid value check, and a data type check. In some examples, the data quality checks are performed against data records of the ingested data. In some examples, data records that do not pass the check will not be deleted; instead a table for rejected data records is created. In some examples, a table is generated that includes the records that pass the data quality checks and the records that do not pass the data quality checks.

In some examples, a data quality check shows a user the quality of the data sets by generating a data quality report. In some examples, depending on the results of the data quality report, a user may decide whether any data cleansing is required for the data. If a user chooses to take action to clean the data, the user may selectively add or omit rows of their data based on configured pass/fail criteria.

In operation 808, apparatus 200 includes means, such as data handling circuitry 210, or the like, for performing identity matching solutions (IMS). In some examples, IMS is used for member matching across DF computing system 102, such as the ability to add a unique identifier to user and link the user to data across various systems and parts of DF computing system 102. In one example, data handling circuitry 210, will store user details to memory 204 and provide a unique Aggregate ID (AID) and Fragment ID (FID). The AID and FID are used as unique identifiers which allow a user to join an individual across various systems.

In operation 810, apparatus 200 includes means, such as data handling circuitry 210, or the like, for performing individual master data management (IMDM). In some examples, IMDM allows users to utilize unique data consumer and data source information gathered from multiple source systems. For example, each user may be associated with a single Master Data file (or a "Golden Record"), which contains all linkable system IDs and additional identification information (e.g. demographic information) that may be leveraged to support commercial opportunities.

In operation 812, apparatus 200 includes means, such as data handling circuitry 210, or the like, for performing address standardization. In some examples, address standardization verifies, validates, and standardizes a diverse set of address formats into one universal format based on reference data, such as USPS-CASS reference data. In some examples, data handling circuitry 210 may send address data to an external service which returns the addresses in their standardized format. In some example, the standardized address format allows all data consumers of the ingested data in the data lake to take advantage of one common address format.

In operation 814, apparatus 200 includes means, such as data handling circuitry 210, or the like, for generating a set of data quality timeliness measurements. In some examples, data handling circuitry 210 is configured to measure the timeliness for each component of the DF computing system 102, such as ingestion, snapshot, ORC, data quality, address standardization, and ingestion to ORC at file level, entity level and source level. In some examples, the measured timeliness metrics at the data source level include times for each of the following: count, minimum interval, max interval, standard deviation, and average duration.

In some examples, the measured timeliness metrics at a data file level include times for each of the following: file arrived time at inbound, ingestion start time, ingestion end time, snapshot start time, snapshot end time, ORC start time, ORC end time, data quality start time, data quality end time, and address standardization time.

Figure 9:
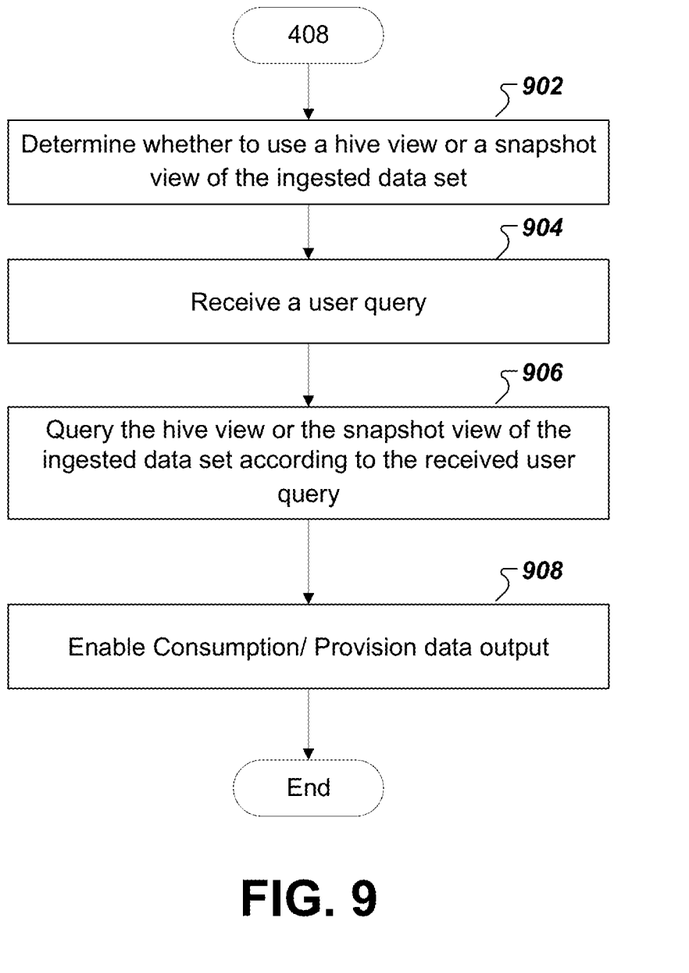
FIG. 9 illustrates a flowchart describing additional example operations for ingesting and consuming data, in accordance with some example embodiments.

Turning now to FIG. 9, a flowchart is provided that illustrates additional example operations for ingesting and consuming data utilizing a trading partner manager (TPM), in accordance with some example embodiments. Specifically, FIG. 9 illustrates a more detailed set of operations for consumption of the ingested data set as discussed previously in connection with operation 410 of FIG. 4. As noted previously, the operations for consuming the ingested data set may be performed by DF computing system 102, with the assistance of, and/or under the control of a computing device such as server 104, which may be embodied by apparatus 200. As described below, apparatus 200 may be configured to consume the ingested data set.

In operation 902, apparatus 200 includes means, such as data handling circuitry 210, or the like, for determining whether to use a hive view or a snapshot table of the ingested data set. In some examples, a hive view will be used for data that has not been enriched in the data lake and a snapshot table will be used for an enriched data set. In some examples, a hive view contains historical data plus incremental data from the historical view and a snapshot table contains only most recent update for the given record with in a table.

In operation 904, apparatus 200 includes means, such as TPM circuitry 212, or the like, for receiving a user query. In some examples, the query may comprise a SQL query against the hive view or against a snapshot or ORC snapshot.

In operation 906, apparatus 200 includes means, such as data handling circuitry 210, or the like, for querying the hive view or the snapshot table of the ingested data set according to the received user query. In some examples, data handling circuitry 210 is further configured to return the query results to the user utilizing TPM circuitry 212.

In operation 908, apparatus 200 includes means, such as TPM circuitry 212, or the like, for enabling further consumption of the data and provisioning data output. For example, a user may output the data to other data handling systems or other data consumption services.

As described above, example embodiments of the present invention provide a Data Management as a Service platform facilitating automation of database management functionality via a trading partner management interface. Example embodiments thus empower users who consume data to take control of the database management process, ending the need to rely exclusively on the expertise, understanding, and time-sensitivity of intermediary database manager(s).

FIGS. 4-9 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for ingesting and consuming data utilizing a trading partner manager (TPM) interface, the method comprising:
providing, by one or more processors of a data fabric computing device, the TPM interface, wherein (a) the TPM interface comprises a plurality of selectable predefined data fabric configurations selectable by a user operating a user computing device, and (b) the plurality of selectable predefined data fabric configurations are used to define a set of data fabric configurations;

receiving, by the one or more processors of the data fabric computing device, user input originating from the TPM interface, wherein (a) the user input comprises one or more selections of the plurality of selectable predefined data fabric configurations and defines the set of data fabric configurations, and (b) the set of data fabric configurations comprises a data source, a data landing zone, a data source type, and a delivery channel;

verifying, by one or more processors of the data fabric computing device, the one or more selections of the plurality of selectable predefined data fabric configurations;

receiving, by the one or more processors of the data fabric computing device and into the data landing zone and based at least in part on the set of data fabric configurations, a data set from the data source in a batch process;

ingesting, by the one or more processors of the data fabric computing device and based at least in part on the data fabric configurations, the received data set, wherein (a) ingesting the received data set comprises performing one or more pre-ingestion checks on each of the received data set, (b) the one or more pre-ingestion checks comprise one or more of a file count check, a duplicate file check, an entity count check, a file transfer completeness check, a schema evolution, or a timely arrival check;

after performing the one or more pre-ingestion checks, storing, by the one or more processors of data fabric computing device, the ingested data set in a data lake, wherein the ingested data set is stored in its ingested form;

after storing the ingested data set in the data lake, performing, by the one or more processors of data fabric computing device, one or more post-ingestion checks on the ingested data set, wherein the one or more post-ingestion checks comprise one or more of a schema validation or a record count check;

after performing the one or more post-ingestion checks, enriching, by the one or more processors of the data fabric computing device and based at least in part on the set of data fabric configurations, the ingested data set, wherein enriching the ingested data set comprises one or more of generating a snapshot, generating a data quality report, performing identity matching solutions, performing address standardization, or generating a set of data quality timeliness measurements;

determining, by the one or more processors by the data fabric computing device and based at least in part on the enriched data set, whether to use a hive view of the enriched data set or a snapshot view of the enriched data set; and in response to determining to use the snapshot view of the enriched data set, enabling, by the one or more processors by the data fabric computing device, consumption of the enriched data set.

2. The computer-implemented method of claim 1, wherein receiving the data set from the data source further comprises:

issuing, by the one or more processors of the data fabric computing device, a pull request requesting the data set to the data source; and receiving, by the one or more processors of the data fabric computing device and by a transmission method, the data set from the data source, wherein the transmission method comprises one of change data capture, sqoop, electronic communication gateway, or message queues.

3. The computer-implemented method of claim 1 further comprising monitoring, by the one or more processors of the data fabric computing device, the data landing zone for a data set to be ingested; and determining, by the one or more processors of the data fabric computing device, that the received data set is in the data landing zone.

4. The computer-implemented method of claim 1, wherein consuming the enriched data set comprises:

receiving, by the one or more processors of the data fabric computing device, a user query; and querying, by the one or more processors of the data fabric computing device, the snapshot view of the enriched data set according to the received user query.

5. The computer-implemented method of claim 1, further comprising:

performing, by the one or more processors of the data fabric computing device, one or more additional data operations on the ingested data set and data handling processes, wherein the one or more additional data operations comprise one or more of heartbeat monitoring of the data handling processes, restarting of failed data handling processes, generating one or more reports regarding the data handling processes, handling errors occurring in one or more of the data handling processes, and maintaining security of the data handling processes and ingested data set.

6. An apparatus for ingesting and consuming data utilizing a trading partner manager (TPM) interface, the apparatus comprising at least one processor and at least one memory including program code, the at least one memory and the program code configured to, with the processor, cause the apparatus to at least:

provide the TPM interface wherein (a) the TPM interface comprises a plurality of selectable predefined data fabric configurations selectable by a user operating a user computing device, and (b) the plurality of selectable predefined data fabric configurations are used to define a set of data fabric configurations;

receive user input originating from the TPM interface, wherein (a) the user input comprises one or more selections of the plurality of selectable predefined data fabric configurations and defines the set of data fabric configurations, and (b) the set of data fabric configurations comprises a data source, a data landing zone, a data source type, and a delivery channel;

verify the one or more selections of the plurality of selectable predefined data fabric configurations;

receive, into the data landing zone and based at least in part on the set of data fabric configurations, a data set from the data source in a batch process;

ingest, based at least in part on the data fabric configurations, the received data set, wherein (a) ingesting the received data set comprises performing one or more pre-ingestion checks on each of the received data set, (b) the one or more pre-ingestion checks comprise one or more of a file count check, a duplicate file check, an entity count check, a file transfer completeness check, a schema evolution, or a timely arrival check;

after performing the one or more pre-ingestion checks, store the ingested data set in a data lake, wherein the ingested data set is stored in its ingested form;

after storing the ingested data set in the data lake, performing one or more post-ingestion checks on the ingested data set, wherein the one or more post-ingestion checks comprise one or more of a schema validation or a record count check;

after performing the one or more post-ingestion checks, enrich, based at least in part on the data fabric configurations, the ingested data set, wherein enriching the ingested data set comprises one or more of generating a snapshot, generating a data quality report, performing identity matching solutions, performing address standardization, or generating a set of data quality timeliness measurements;

determine, and based at least in part on the enriched data set, whether to use a hive view of the enriched data set or a snapshot view of the enriched data set; and in response to determining to use the snapshot view of the enriched data set, enable consumption of the enriched data set.

7. The apparatus of claim 6, wherein to receive the data set from the data source the memory and program code are further configured to, with the processor, cause the apparatus to:

issue a pull request requesting the data set to the data source; and receive, by a transmission method, the data set from the data source, wherein the transmission method comprises one of change data capture, sqoop, electronic communication gateway, or message queues.

8. The apparatus of claim 6, wherein the memory and program code are further configured to, with the processor, cause the apparatus to:

monitor the data landing zone for a data set to be ingested; and determine that the received data set is in the data landing zone.

9. The apparatus of claim 6, wherein to consume the enriched data set the memory and program code are further configured to, with the processor, cause the apparatus to:

receive a user query; and query the snapshot view of the enriched data set according to the received user query.

10. The apparatus of claim 6, wherein the memory and program code are further configured to, with the processor, cause the apparatus to:

perform one or more additional data operations on the ingested data set and data handling processes, wherein the one or more additional data operations comprise one or more of heartbeat monitoring of the data handling processes, restarting of failed data handling processes, generating one or more reports regarding the data handling processes, handling errors occurring in one or more of the data handling processes, and maintaining security of the data handling processes and ingested data set.

11. A non-transitory computer-readable storage medium for ingesting and consuming data utilizing a trading partner manager (TPM) interface, the non-transitory computer-readable storage medium storing program code instructions that, when executed, cause a data fabric computing device to:

provide the TPM interface wherein (a) the TPM interface comprises a plurality of selectable predefined data fabric configurations selectable by a user operating a user computing device, and (b) the plurality of selectable predefined data fabric configurations are used to define a set of data fabric configurations;

receive user input originating from the TPM interface, wherein (a) the user input comprises one or more selections of the plurality of selectable predefined data fabric configurations and defines the set of data fabric configurations, and (b) the set of data fabric configurations comprises a data source, a data landing zone, a data source type, and a delivery channel;

verify the one or more selections of the plurality of selectable predefined data fabric configurations;

receive, into the data landing zone and based at least in part on the set of data fabric configurations, a data set from the data source in a batch process;

ingest, based at least in part on the data fabric configurations, the received data set, wherein (a) ingesting the received data set comprises performing one or more pre-ingestion checks on each of the received data set, (b) the one or more pre-ingestion checks comprise one or more of a file count check, a duplicate file check, an entity count check, a file transfer completeness check, a schema evolution, or a timely arrival check;

after performing the one or more pre-ingestion checks, store the ingested data set in a data lake, wherein the ingested data set is stored in its ingested form;

after storing the ingested data set in the data lake, performing one or more post-ingestion checks on the ingested data set, wherein the one or more post-ingestion checks comprise one or more of a schema validation or a record count check;

after performing the one or more post-ingestion checks, enrich, based at least in part on the data fabric configurations, the ingested data set, wherein enriching the ingested data set comprises one or more of generating a snapshot, generating a data quality report, performing identity matching solutions, performing address standardization, or generating a set of data quality timeliness measurements;

determine, and based at least in part on the enriched data set, whether to use a hive view of the enriched data set or a snapshot view of the enriched data set; and in response to determining to use the snapshot view of the enriched data set, enable consumption of the enriched data set.

12. The non-transitory computer-readable storage medium of claim 11, the non-transitory computer-readable storage medium storing further program code instructions that, when executed, cause the data fabric computing device to further:

issue a pull request requesting the data set to the data source; and receive, by a transmission method, the data set from the data source, wherein the transmission method comprises one of change data capture, sqoop, electronic communication gateway, or message queues.

13. The non-transitory computer-readable storage medium of claim 11, the non-transitory computer-readable storage medium storing further program code instructions that, when executed, cause the data fabric computing device to further:

monitor the data landing zone for a data set to be ingested; and determine that the received data set is in the data landing zone.

14. The non-transitory computer-readable storage medium of claim 11, the non-transitory computer-readable storage medium storing further program code instructions that, when executed, cause the data fabric computing device to further:

receive a user query; and query the snapshot view of the enriched data set according to the received user query.

15. The non-transitory computer-readable storage medium of claim 11, the non-transitory computer-readable storage medium storing further program code instructions that, when executed, cause the data fabric computing device to further:

perform one or more additional data operations on the ingested data set and data handling processes, wherein the one or more additional data operations comprise one or more of heartbeat monitoring of the data handling processes, restarting of failed data handling processes, generating one or more reports regarding the data handling processes, handling errors occurring in one or more of the data handling processes, and maintaining security of the data handling processes and ingested data set.

* * * * *